Oct. 18, 1949.  W. D. RENNER  2,485,412
DRYING REEL
Filed Sept. 6, 1945  2 Sheets-Sheet 1
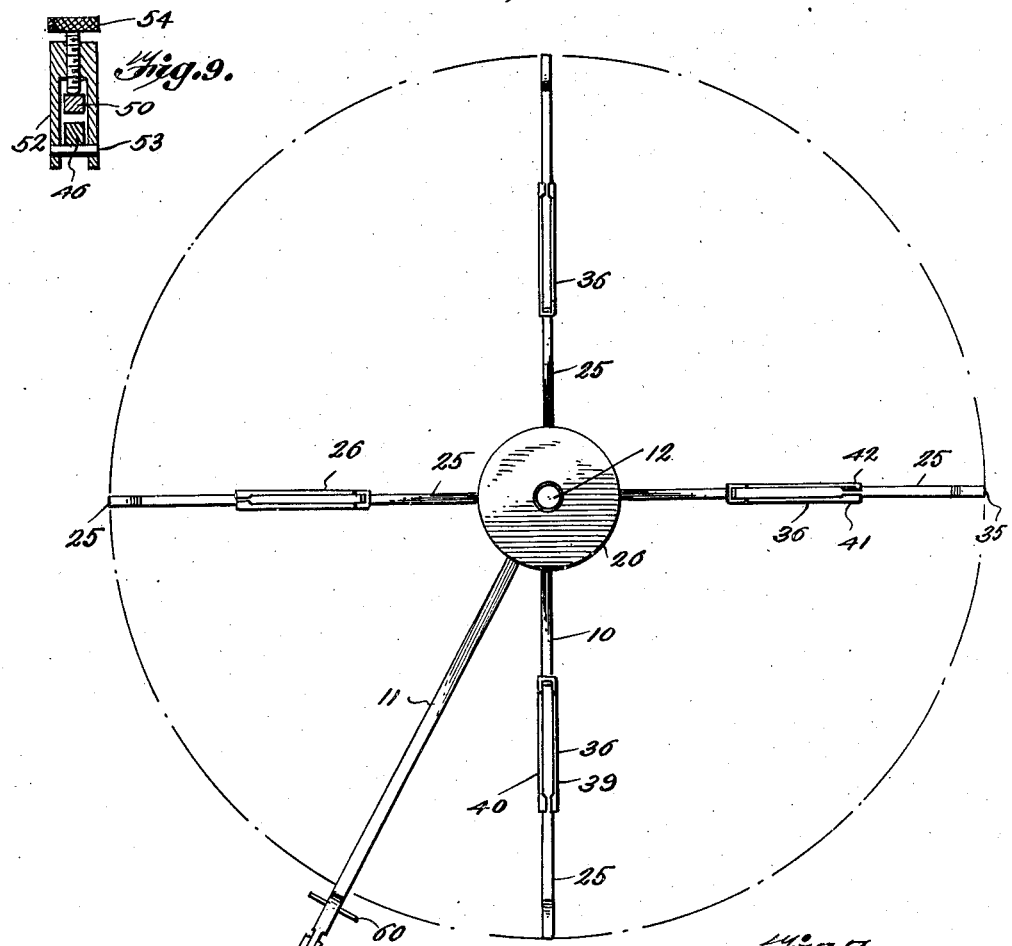
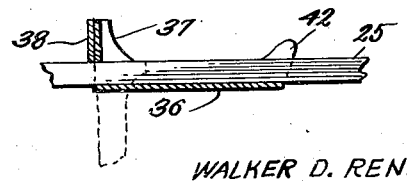
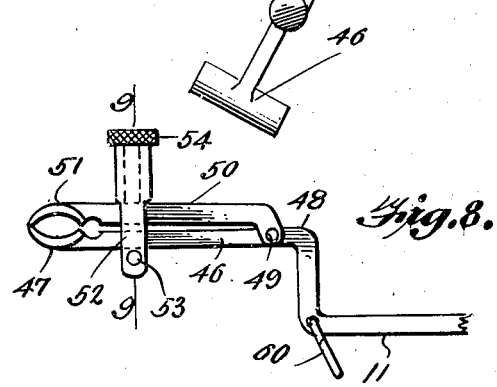
Inventor
WALKER D. RENNER
By Randolph & Beavers
Attorneys Oct. 18, 1949.     W. D. RENNER     2,485,412
DRYING REEL
Filed Sept. 6, 1945     2 Sheets-Sheet 2
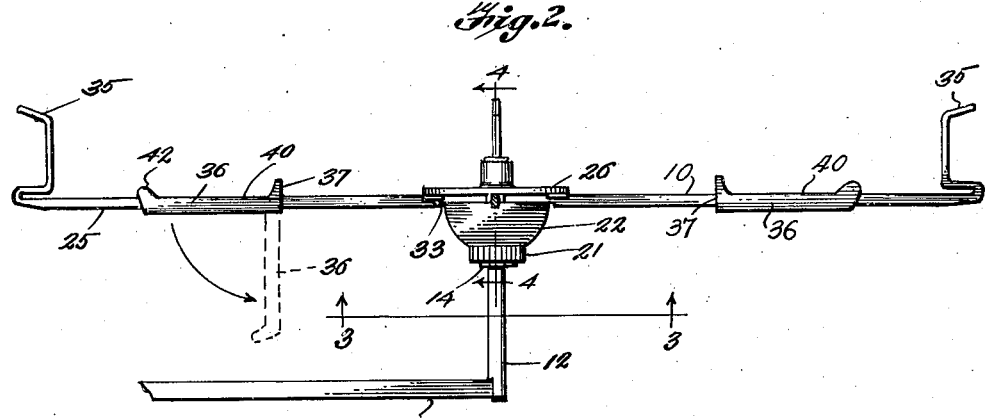
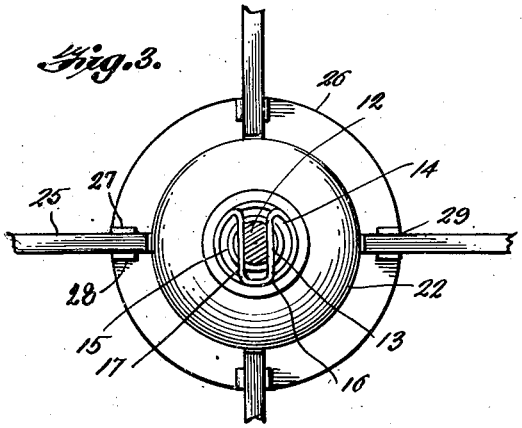
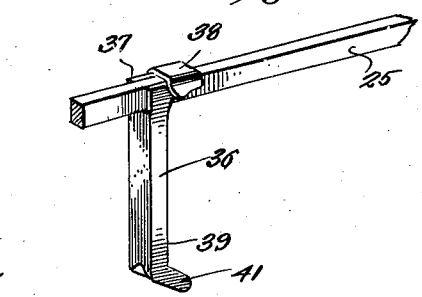
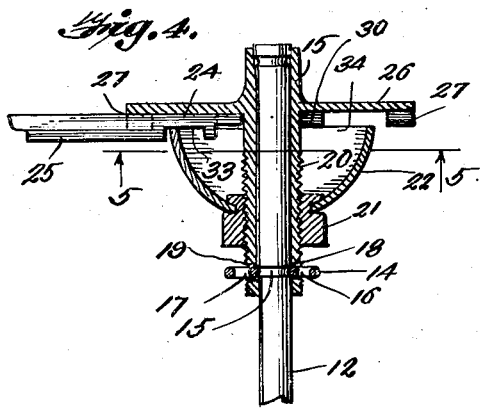
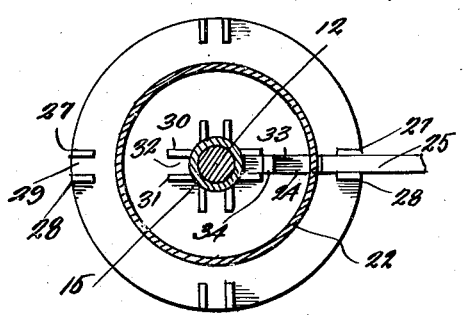
Inventor
WALKER D. RENNER
By *Randolph & Beavers*
Attorneys Patented Oct. 18, 1949

2,485,412

UNITED STATES PATENT OFFICE 2,485,412

DRYING REEL

Walker D. Renner, Blacksville, W. Va.

Application September 6, 1945, Serial No. 614,753

2 Claims. (Cl. 242—115)

This invention relates to reeling or winding devices and more particularly to the type generally used for drying or transferring fishing line.

An object is to provide such a device that may be collapsed to a very compact position.

Another object is to provide a reel that may be used either for coiling or uncoiling purposes.

Another object is the provision of a reel that, in a simple and easy manner, facilitates the reversing of the ends of the line on the fishing reel.

Another object is to provide such a reel with a means for producing a coil of any desired circumference.

Another object is the provision of a means whereby the line may be taken from its original spool and unwound therefrom to the fishing reel.

Other objects of the invention will be more apparent upon a consideration of the accompanying drawings and the following specification, wherein is disclosed a single exemplary embodiment of the invention, with the understanding however, that such changes may be made therein as fall within the scope of the appended claims, without departing from the spirit of the invention.

In the drawings:

Figure 1 is a top plan view of the device;

Figure 2 is a side elevation of the device;

Figure 3 is a bottom plan view taken on the line 3—3 of Fig. 2;

Figure 4 is a sectional view taken on the line 4—4 of Fig. 3;

Figure 5 is a view partly in section and partly in elevation, taken on the line 5—5 of Fig. 4;

Figure 6 illustrates, in detail, one of the adjustable brackets in its extended position;

Figure 7 illustrates the bracket shown in Fig. 6 in its collapsed position;

Figure 8 is a detailed view of the reel clamping or anchoring means;

Figure 9 is a section taken on the line 9—9 of Fig. 8.

Referring now to the drawings the numeral 10 indicates the reel as a whole, a supporting arm 11 is rigidly attached, in any convenient manner, to a spindle 12 and, positioned approximately at the middle of the spindle is a groove 13 which is arranged for reception therein of a clip spring 14. This spring acts as a retaining means for a sleeve 15 by having its arms 16 and 17 arranged longitudinally through openings 18 and 19, which are in the lower end of the sleeve 15, the arms 16 and 17 will protrude through said openings and work in the groove 13.

The sleeve 15 is threaded, as shown at 20 and receives thereon the nut 21 which carries, or has integral therewith, an upturned cup 22. Near the upper end of the sleeve 15 is located a disc 26, which, preferably is made integral therewith. The disc 26 has positioned on its underside a series of pairs of guide members 27 and 28, each pair of guide members forming slots 29 and which are located at the outer periphery of the disc. There may be provided any number of such pairs and as they are all similar, the above description of one pair is believed to be completely illustrative. On the inner portion of the disc, that is, adjacent the sleeve 15, are similar and complementary pairs of guides 30 and 31, each pair of which will form a slot 32.

The slots 29 and 32 are arranged to receive therein the inner end 24 of a bracket supporting arm 25 which has a cut-away portion 33, said cut-away portion fitting over the upper lip of a cup 22. This portion facilitates the assembling of the device. Further inwardly of the end 24 is a stop lug 34, which, when the reel is in collapsed position will bear against the inner side of the lip of the cup 22 and thereby prevent disengagement therefrom.

The arm 25 extends outwardly through the slot 29 and has arranged at its outer end an upstanding bracket 35 and as the arm 25 is preferably made of wire it may be bent, at this end, to substantially the configuration clearly illustrated in Fig. 2.

Slidably arranged on the arm 25 is provided a second bracket 36, the bracket being adjustable both with reference to the spindle 12 and bracket 35 due to its slide-ability, while it may also be swung to the position shown in Figs. 2 and 7 when it is not in use or when it is desired to collapse the reel. The bracket 36 is preferably made of pliable metal and is also preferably made in one piece. The arm attaching end 37 has the overlapping portion 38 thereon which is an extension of one of the sides and overlaps the end of the other side and which will act to slideably and swingably retain this end of the bracket on the arm 25. The sides 39 and 40 are upturned, as shown, for substantially their entire lengths and at their outer ends are provided the arms 41 and 42 which extend above the sides 39 and 40 and due to the pliability and flexibility of the metal will snap over the arm 25 and retain the outer end of the bracket against the arm. From the above it will be seen, that in addition to the first bracket 35 I have provided a second bracket which may be swung into operative position when desired and swung away from such position after it has served its purpose and which also may be moved to afford complete compactness, on its part, when the reel is in collapsed position.

Referring particularly to Figs. 8 and 9, there is, at the outer end of the supporting arm 11 a clamp 46 having a jaw 47 which is positioned at the outer end of the offset 48 of the arm 11. Pivoted at 49 on the offset 48 is preferably a forked portion with an arm 50 outwardly extending therefrom and which carries at its outer extremity a jaw 51 to act in conjunction with the jaw 47. A fastening clamp for the jaws comprises a forked member 52 which fits over the arms 48 and 50 and has arranged at the lower end thereof a pin 53 extending therethrough and which rests in sections on the underside of the arm 48. The pin is held fast in the sections by means of a thumb screw 54 which is threaded into the upper portion of the fork member 52.

The operation of the device is as follows. The clamp 46 should be attached to a base, such as the rod which carries the fishing reel and, assuming that the parts are in the position shown in Fig. 1, if it is desired to transfer the line from a coil to the fishing reel, swing the brackets 36 to operative position and then adjust them to the size of the coil by sliding them on the arm 25, then fasten the free end of the line to the fishing reel and wind the latter. The coil bearing reel will rotate about the spindle 12 thus releasing the line.

In order to coil the line adjust the bracket 36 to the size coil desired and wind from the fishing reel. In order to remove the coil it is only necessary to move one of the adjustable brackets 36 inwardly on the arm 25 which action will loosen the coil sufficiently to remove the same.

If it is desired to reverse the ends of the line on the fishing reel then transfer the line to the bracket 35, and slide the adjustable brackets 36 all the way out to the ends of the arms 25. A double reel is thereby provided. Then attach the free end of the line to one of the adjustable brackets 36, keeping from one to two rounds of slack line. Hold the line in one hand and turn reel with the other hand but, turn it in the opposite direction from that in which the line has been coiled on the brackets 35. This action will uncoil the line from brackets 35 while coiling it on brackets 36. The line may now be transferred to the fishing wheel in the manner already described and it will then have been reversed, turning the line end for end.

When new line is desired to be transferred to the fishing reel, it is only necessary to remove the reel from the spindle and place the spool of new line thereon, then wind the fishing reel in the usual manner.

In order to collapse the reel and put it in its compact position, pressure should be applied on the disc 26 which will cause the longitudinal arms 16 and 17 of the clip spring 14 to become unseated from the groove 13 and thus allow the reel to be moved downward on the spindle 12. The nut 21 is then loosened thereby lowering the cap 22 away from the disc 26, which action will permit the ends 24 of the arm 25 to become disengaged from the slots 29 and 32. The arms 25 are then pulled outwardly until the lug 34 stops the outward movement by contacting the lip of the cap 26. The arms 25 are then moved next to the supporting arm 11, preferably two arms 25 on each side thereof and the wire clip 60, pivoted at the lower end of the offset 48, will then receive and retain the tips of the brackets 35 after this end of the arms 25 have been lowered.

When the reel is to be set up, the above actions should be reversed.

The above purposes of the invention, as well as affording a line dryer, are accomplished in a simple and direct manner and the apparatus for attaining these ends is uncomplicated in construction and very easily assembled.

Having thus described my invention, what I claim is:

1. A drying reel comprising a supporting shaft, a sleeve rotatably disposed on the upper portion of the shaft, a swiveled connection between the shaft and the sleeve, a disk-shaped top radially projecting from the sleeve, the lower portion of the sleeve being formed with threads, a nut feedable on the threaded portion of the sleeve, a cup carried by the nut and having its open top side opposed to the disk-shaped top, said disk-shaped top being of a diameter greater than that of the cup with its peripheral portions projecting beyond the periphery of the cup, the peripheral portion of the disk-shaped top being provided with pairs of depending lugs, arms provided with reduced portions at their inner ends, disposed over the upper edge of the cup, said cup being feedable upwardly by said nut to clamp the inner reduced portions of the arms against the underside of the top, with the arms projecting between the lugs on the top, the outer ends of the arms being provided with material engaging brackets.

2. A drying reel comprising a supporting shaft, a sleeve rotatably disposed on the upper portion of the shaft, a swiveled connection between the shaft and the sleeve, a disk-shaped top radially projecting from the sleeve, the lower portion of the sleeve being formed with threads, a nut feedable on the threaded portion of the sleeve, a cup carried by the nut and having its open top side opposed to the disk-shaped top, said disk-shaped top being of a diameter greater than that of the cup with its peripheral portions projecting beyond the periphery of the cup, the peripheral portion of the disk-shaped top being provided with pairs of depending lugs, arms provided with reduced portions at their inner ends, disposed over the upper edge of the cup, said cup being feedable upwardly by said nut to clamp the inner reduced portions of the arms against the underside of the top, with the arms projecting between the lugs on the top, the outer ends of the arms being provided with material engaging brackets, the inner ends of the arms being adapted to engage the sleeve and provided with depending stop lugs for engaging the edge portion of the cup when the arms are collapsed.

WALKER D. RENNER.

REFERENCES CITED

The following references are of record in the file of this patent:

UNITED STATES PATENTS

| Number | Name | Date |
|---|---|---|
| 745,825 | Guthrie | Dec. 1, 1903 |
| 1,542,485 | Stevenson | June 16, 1925 |
| 1,958,838 | Roelofs et al. | May 15, 1934 |
| 2,150,477 | Wright | Mar. 14, 1939 |